United States Patent Office 2,725,378
Patented Nov. 29, 1955

2,725,378

PYRROLE DYES AND METHODS OF MAKING THEM

Kenneth J. Reed, Wealdstone, England, assignor to Eastman Kodak Company, Rochester, N. Y., a corporation of New Jersey No Drawing. Application September 19, 1951, Serial No. 247,382

12 Claims. (Cl. 260—240.7)

This invention relates to an improved process for making pyrrole dyes and to new dyes obtained therefrom.

It is known that monomethine cyanine dyes can be prepared by condensing a 2,5-dimethylpyrrole with a pyrrole-3-aldehyde. Such a process is described, for example, in British Patent 529,440, accepted November 21, 1940.

I have now found an improved method for making dyes of this class having the advantages of simplicity and a more economical operation.

It is, therefore, an object of my invention to provide an improved method for making monomethine cyanine dyes containing a pyrrole nucleus. Another object is to provide new dyes obtained according to my new process. Still another object is to provide photographic elements containing the dyes of my invention.

According to my invention, I prepare monomethine dyes containing a pyrrole nucleus by condensing a pyrrole base with formic acid. Typical pyrrole bases include those represented by the following general formula:

I. 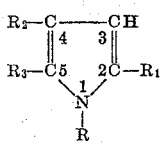

wherein R represents an alkyl group, e. g. methyl, ethyl, n-propyl, n-amyl, n-heptyl, n-decyl, n-dodecyl (lauryl), stearyl, benzyl, (phenylmethyl), phenylethyl, etc. (especially a primary alkyl group containing from 1 to 18 carbon atoms), a cycloalkyl group, e. g. cyclopentyl, cyclohexyl, etc. (especially a cycloalkyl group containing from 5 to 6 carbon atoms), or an aryl group, e. g. phenyl, o-, m-, and p-tolyl, p-chlorophenyl, o-hydroxyphenyl, p-methoxyphenyl, p-ethoxyphenyl, phenyl-o-carboxylic acid, α- or β-naphthyl, etc. (especially a mononuclear aryl group of the benzene series), $R_1$ and $R_3$ each represent an alkyl group, e. g., methyl, ethyl, etc., (such as a primary alkyl group of from 1 to 4 carbon atoms, and more especially a methyl group), and $R_2$ represents a hydrogen atom or has the values assigned to R. R can also represent a 1-pyrrylalkyl group, e. g., a 2,5-dimethyl-1-pyrrylethyl group. $R_1$ can also represent a phenyl group.

The formic acid used in my invention can vary in concentration, although I have found that a concentration of from 50 to 100 per cent by weight (and more particularly 80 to 90 per cent) is especially advantageous. The condensations are accelerated by heating and temperatures varying from about room temperature to the temperature of the steam bath can be used. Advantageously, I carry out my condensations by heating the reactants together on a steam bath.

The formation of the monomethine dyes in accordance with the process of my invention can be schematized according to the following equation:

II. 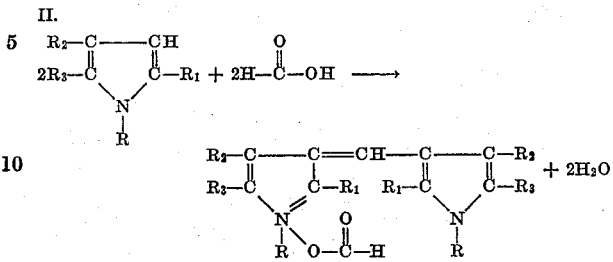

wherein R, $R_1$, $R_2$, and $R_3$ have the values set forth above. Although the above equation calls for two molecular equivalents of each reactant, I can advantageously employ an excess of one of the reactants. Generally, the formic acid is employed in excess. When using a pyrrole base wherein R is a 1-pyrrylalkyl group, I can obtain a monomethine dye which is probably represented by the following general formula:

III. 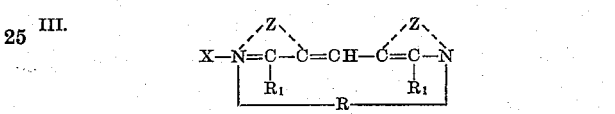

wherein R represents an alkylene group (e. g. methylene, ethylene, propylene, etc.), or an arylene group, e. g. diphenylene, $R_1$ has the values set forth above (especially a methyl group), Z represents the non-metallic atoms necessary to complete a heterocyclic nucleus of the pyrrole series, and X represents an anion (e. g. chloride, bromide, iodide, thiocyanate, sulfamate, methylsulfate, ethylsulfate, perchlorate, benzenesulfonate, p-toluenesulfonate, xylenesulfonate, etc.). The formate of the dye first formed can be converted into a different salt by the addition of an acid stronger than formic acid or a soluble salt, the anion of which produces a dye more insoluble than the first-formed dye. Typical acids include, for example, perchloric acid, sulfuric acid, hydriodic acid, etc. See for example U. S. Patents 2,245,249 and 2,245,250, both issued June 10, 1941.

The dyes of the instant invention are useful coloring matters and have been found to be particularly useful for the preparation of light-screening layers in photographic elements, especially elements carrying sensitive silver halide layers. The dyes can be used in backing or anti-halation layers either alone or in combination with other dyes, or in light filter layers overlying one or more light-sensitive layers or between two light-sensitive layers. Many of the dyes are inert photographically and are rapidly bleached or destroyed by the alkaline photographic developing solutions normally used in processing exposed photographic layers to a visible image.

For the preparation of over-coating layers, filter layers or anti-halation layers according to my invention, from 50 mg. to 150 mg. of dye is dissolved in from 2 to 5 cc. of a water-miscible solvent. Methanol or acetone is suitable for this purpose but pyridine or ethylene glycol monoethyl ether can also be used. The solution is then added to about 25 cc. of a 5 per cent gelatine solution at 40° C. and the mixture coated on the support. If the iodide salt has been made and this is found to be insufficiently soluble in the water-miscible solvent, it can be converted into the dye chloride by double decomposition in solution in cresol.

The following examples will serve to illustrate more fully the manner whereby I practice the process of my invention.

EXAMPLE 1

*Bis-3-(1-cyclohexyl-2,5-dimethylpyrrolo) monomethine cyanine perchlorate*

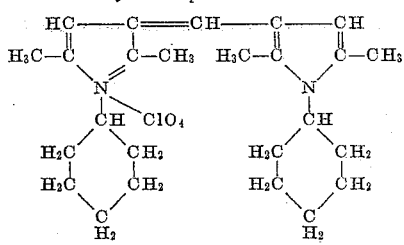

Cyclohexylamine (198 g., 2 mols), acetonyl acetone (228 g., 2 mols) and benzene (450 cc.) were refluxed together overnight in an apparatus arranged to collect the water generated in the reaction. After distillation of the benzene, 1-cycloxhexyl-2,5-dimethylpyrrole was distilled at 15 mm. and was collected as a colorless oil having a boiling point of 128–134° C. The yield was 310 g. (87 per cent of theory). It solidified to a colorless solid on cooling.

90 per cent formic acid (500 cc.) and the pyrrole base (170 g.) obtained above were slowly heated to boiling, and gently refluxed together for five minutes. The deep orange solution was cooled at 30° C. and 60 per cent perchloric acid (225 cc.) was added. After triturating and cooling to 20° C., a mass of orange leaflets separated, which was filtered and washed with a 1:1 mixture of 90 per cent formic and 60 per cent perchloric acids (75 cc.) and then with water (1000 cc.). The yield of dye, which was obtained in a pure condition having a melting point of 215° C., was 75 g. The dye was soluble in ethanol or chloroform and had an absorption maximum at 520 m$\mu$. It was completely decolorized by weakly alkaline solutions, such as are encountered in photographic developers, and it was photographically inert.

EXAMPLE 2

*Bis-3-(1-dodecyl-2,5-dimethylpyrrolo) monomethine cyanine sulfate*

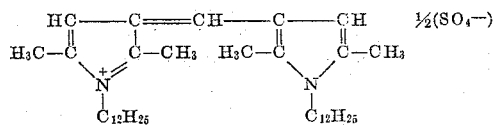

1-dodecyl-2,5-dimethylpyrrole (Lions et al.: "Proc. Roy. Soc., New South Wales," vol. 71 (1937), page 92) (263 g., 1 mol.) and 90 per cent formic acid (625 cc.) were stirred on a steam-bath until dissolution was complete (10 minutes). Heating was continued for another 50 minutes and after cooling the dye was precipitated by pouring the solution slowly into a vigorously stirred mixture of ice (5 kg.) and concentrated sulfuric acid (500 cc.). The dye was filtered, washed with 2 per cent sulfuric acid (500 cc.). Without drying, the dye was recrystallized from ethanol (1000 cc.) containing sulfuric acid (10 cc.) and separated as a mass of golden leaflets. These were filtered and washed with ethanol (200 cc.). The yield of dye was 200 g. This dye had an absorption maximum at 420 m$\mu$, was photographically inert, and was bleached by alkaline photographic developers.

EXAMPLE 3

*Bis-3-(1-ethyl-2:5-dimethylpyrrolo) monomethine cyanine perchlorate*

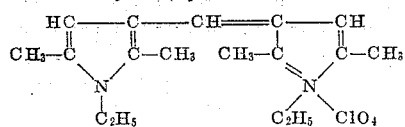

Ethylamine, 33% w/w in ethanol (135 g., 1 mol.) and acetonyl acetone (144 g., 1 mol.) were refluxed together for 16 hours. The water that had formed was removed by heating under vacuum on the steam bath for 2 hours. The 1-ethyl-2:5-dimethyl pyrrole was distilled at atmospheric pressure and collected as an oil, B. P. 174–178° C. Yield 65 g. or 52%. 24.7 g. (0.2 mol.) of the pyrrole and 90% formic acid (130 cc.) were heated for 6 minutes. The resulting solution was poured into 1 liter of water containing sodium perchlorate (20 g.). The dyestuff which precipitated was filtered off and recrystallized from ethanol as brown prisms, M. P. 199° C. It gives a yellow solution in suitable solvents which is bleached by alkaline sulfite solutions such as photographic developers.

EXAMPLE 4

*Bis-3-(1-n-butyl-2:5-dimethylpyrrolo) monomethine cyanine perchlorate*

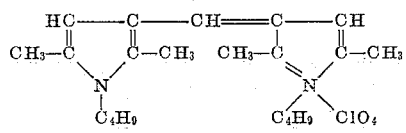

n-Butylamine (110 g.) and acetonyl acetone (188 g.) were mixed at room temperature whereupon the temperature rose to 102° C. When cool the water that had formed was separated, the 1-n-butyl-2:5-dimethyl pyrrole was distilled at atmospheric pressure and collected as a colorless oil, B. P. 205–210° C. Yield 180 g. or 80%. The pyrrole (3 g.) and 90% formic acid (8 cc.) were heated together at 100° C. for 15 minutes then cooled to 20° C. and 60% perchloric acid (2.5 cc.) was added. The yellow dyestuff was isolated by pouring the solution into cold water and filtering. It was recrystallized from methanol. Yield 2.2 g. or 53.5%, M. P. 177° C. The dye was bleached by alkaline sulfite solutions such as photographic developers.

EXAMPLE 5

*Bis-3-(1-n-octyl-2:5-dimethylpyrrolo) monomethine cyanine perchlorate*

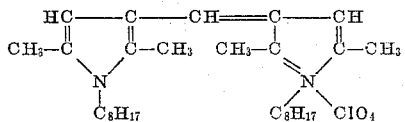

n-octylamine (65 g.) and acetonyl acetone (63 g.) were mixed at room temperature and heated on the steam bath for ½-hour whilst stirring vigorously. When cool, the water layer was separated off and the pyrrole layer dried with calcium chloride. The 1-n-octyl-2:5-dimethyl pyrrole was distilled off under reduced pressure and collected as a colorless oil, B. P. 151–157° C./15 mm. Yield 74 g. or 72%. The pyrrole (26 g.) and 90% formic acid (62 cc.) were heated together to boiling for 10 minutes and boiling continued for a further 5 minutes. Cooled to 20° C. and 60% perchloric acid (30 cc.) was added whereupon the yellow dyestuff precipitated and was filtered off. Recrystallized from methanol (90 cc.). Yield 22 g. or 67%. M. P. 144–145° C.

The dyestuff is freely soluble in solvents such as acetone and chloroform and is bleached by alkaline sulfite solutions such as photographic developers.

EXAMPLE 6

*Bis-3-(1-n-octadecyl-2:5-dimethylpyrrolo) monomethine cyanine formate*

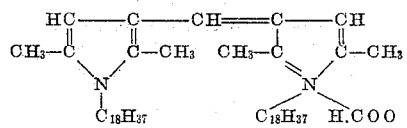

Octadecylamine (54 g.), acetonyl acetone (23 g.) and ethanol (100 cc.) were refluxed together on the steam-bath for 3 hours. The alcohol and water were then distilled off. The 1-n-octadecyl-2:5-dimethylpyrrole was distilled under reduced pressure as an oil, B. P. 240–255° C./10 mm. which set to a semi-solid on standing. Yield 52 g. or 83%. The pyrrole (5 g.) and 90% formic acid (25 cc.) were refluxed together for one hour, cooled and poured with solution into water when the dyestuff precipitated as a bright yellow solid. The solid was filtered and washed with water. Yield 6.1 g. (contains water and free formic acid), M. P. 60–61° C. The dye was freely soluble in solvents and bleached by alkaline sulfite solutions such as photographic developers.

EXAMPLE 7

Bis-3-(1-phenyl-2:5-dimethylpyrrolo) monomethine cyanineperchlorate

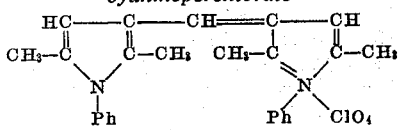

Aniline (23.3 g.), acetonyl acetone (32 g.) and benzene (100 cc.) were refluxed together for 24 hours in an apparatus to collect the water formed during the reaction and the benzene removed by distillation. The 1-phenyl-2:5-dimethyl pyrrole crystallised and was filtered off; M. P. 50° C. Yield 39 g. or 91%. The pyrrole (4.3 g.) and 90% formic acid (10 cc.) were heated together for 15 minutes at 100° C., cooled to 20° C. and 60% perchloric acid (3 cc.) was added whereupon the dyestuff precipitated. The solid was filtered off and recrystallised with difficulty from methanol in poor yield; M. P. 222° C. The yellow dye is soluble in solvents such as alcohol and acetone and is bleached by alkaline sulfite solutions such as photographic developers.

EXAMPLE 8

Bis-3-(1-n-butyl-5-methyl-2-propyl pyrrolo) monomethine cyanine perchlorate

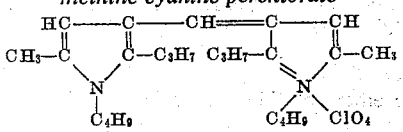

Chloromethyl propyl ketone (by method of Ritter and Sokol J. A. C. S., 70, 3419 (1948). (3 g.) and ethyl acetoacetate-sodium derivative (3.8 g.) in 20 cc. alcohol were mixed together, immediate reaction occurring. Refluxed for ½-hour and then the alcohol was evaporated off. The mass remaining was diluted with water, extracted with ether and then the ether evaporated off. The residual oil was hydrolysed by refluxing for 3 hours with 1:2 sulphuric acid/water. The octane-2:5-dione was extracted with ether, dried with sodium sulfate and the ether distilled off. Yield 1.1 g. The diketone (1.1 g.) and butylamine (0.6 g.) were heated together for 1 hour on the steam-bath. The resulting oil was dried with sodium sulfate and finally distilled under reduced pressure. Yield 0.5 g. or 11% overall. The pyrrole (0.5 g.) and 90% formic acid (2 cc.) were heated together at 100° C. for ½-hour, a yellow dye being rapidly formed and on cooling to 20° C., 60% perchloric acid (0.5 cc.) was added. The solution was poured into iced water and the dyestuff extracted with ether. The solution was found to be bleached by alkaline sulfite solutions such as photographic developers.

EXAMPLE 9

Bis - 3 - (1 - o - hydroxyphenyl - 2:5 - dimethylpyrrolo) monomethine cyanine perchlorate

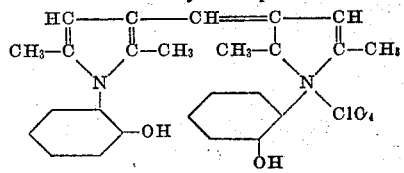

o-Aminophenol (5.4 g.), acetonyl acetone (5.7 g.) and ethanol (25 cc.) were heated together on the steam bath for 1 hour and then poured into water when the 1-o-hydroxyphenyl-2:5-dimethyl pyrrole separated as a pink solid. Filtered. Yield 7 g. or 74%, M. P. 94–95° C. The pyrrole (3.7 g.) and 90% formic acid (8 cc.) were heated together at 100° C. for 20 minutes. The dyestuff was isolated by adding 60% perchloric acid (2.5 cc.) and pouring the solution into cold water and filtering off. The solid dyestuff was purified by dissolving it in methanol, again pouring into excess cold water, filtering and drying the solid. Yield 2.7 g. or 23%. Decomposes above 200°. Freely soluble in solvents such as acetone and alcohol but not bleached by alkaline sulfite solutions.

EXAMPLE 10

Bis - 3 - (1-o-carboxyphenyl-2:5-dimethylpyrrolo) monomethine cyanine perchlorate

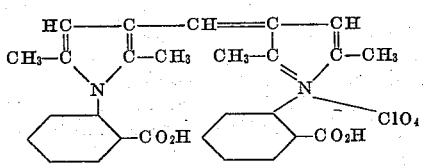

Anthranilic acid (13.7 g.), acetonyl acetone (11.4 g.) and alcohol (50 cc.) were refluxed together for 1½ hours. The 1-o-carboxyphenyl-2:5-dimethyl pyrrole was separated as a solid by pouring the solution into water and this was filtered off and recrystallized from 1:1 water/ethanol mixture. Yield 16 g., or 75%; M. P. 124° C. (decomp.). The pyrrole (49 g.) and 90% formic acid (8 cc.) were heated together at 100° C. for 20 minutes giving an intense green solution which was cooled to 20° C. and 60% perchloric acid (2.5 cc.) added. The dyestuff was isolated by pouring the solution into water and filtering off, after which it was dissolved in methanol and reprecipitated by pouring into cold water. Yield 1.3 g. or 12%; M. P. 71–72° C. The dye gives intense green solutions in solvents such as alcohol and acetone and is bleached by alkaline sulfite solutions such as photographic developers.

EXAMPLE 11

Bis-3-(1-anilino-2:5-dimethylpyrrolo) monomethine cyanine perchlorate

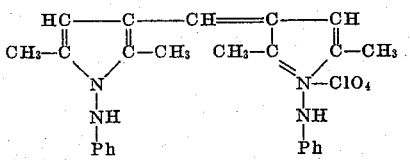

Phenyl hydrazine (27 g.), acetonyl acetone (32 g.) and benzene (50 cc.) were refluxed together for 1½ hours in an apparatus arranged to collect the water produced and the remaining volatiles removed by distillation. The residue was dissolved in glacial acetic acid and crystallised. The 1-anilino-2:5-dimethyl pyrrole was filtered off and recrystallised twice more from glacial acetic acid. Yield 8 g. or 17%; M. P. 80° C. The pyrrole (4.3 g.) and 90% formic acid (12.5 g.) were heated together at 100° C. for 15 minutes, cooled to 20° C. and 60% perchloric acid (3 cc.) added whereupon the dyestuff precipitated. This was filtered off and recrystallised, with difficulty, from methanol. Yield 1.2 g. or 20%; M. P. 209° C. The dyestuff is soluble in solvents such as acetone and alcohol and is bleached by alkaline sulfite solutions such as photographic developers.

EXAMPLE 12

*Bis-3(1-benzyl-2:5-dimethylpyrrolo) monomethine cyanine perchlorate*

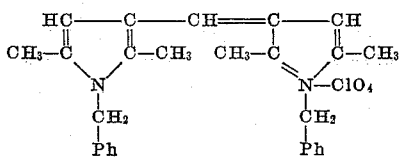

Benzylamine (21.4 g.) and acetonyl acetone (25 g.) were mixed together at room temperature when an exothermic reaction occurred and crystals appeared on cooling. Water was added and the colorless crystals of 1-benzyl-2:5-dimethyl pyrrole were filtered off. Yield 24 g. or 60%; M. P. 40° C. The pyrrole (18.5 g.) and 90% formic acid (50 cc.) were refluxed together for 5 minutes, cooled to 35° C. and 60% perchloric acid (22.5 cc.) added. The dyestuff precipitated and the mixture was cooled to 20° C. and filtered. The dye was washed with 50% formic acid/perchloric acid (10 cc.) and water (100 cc.) and finally oven dried. Orange dye freely soluble in methanol and chloroform was obtained. Yield 15 g. or 62.5%; M. P. 211° C. (decomp.). The dye was bleached by alkaline sulfite solutions such as photographic developers.

EXAMPLE 13

*Bis-3-(1-(α-pyridyl)-2:5-dimethylpyrrolo) monomethine cyanine perchlorate*

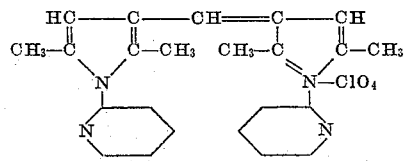

2-aminopyridine (19 g.), acetonyl acetone (25 g.) and concentrated hydrochloric acid (2 cc.) were refluxed together for 4 hours. The products were distilled under reduced pressure and the 1-(2-pyridyl)-2:5-dimethyl pyrrole was collected as an oil, B. P. 140–144° C./11 mm. Yield 13 g. or 38%. The pyrrole (2 cc.) and 90% formic acid (5 cc.) were heated together at 100° C. for 3 hours. An orange red colour slowly developed indicating the presence of the dye.

EXAMPLE 14

Ethylene diamine (12 g.), acetonyl acetone (45.6 g.) and ethanol (50 cc.) were refluxed together for 1 hour. 1,1'-ethylene-bis-(2:5-dimethyl pyrrole) separated on cooling, it was filtered and recrystallised from methanol. Yield 30 g. or 73%; M. P. 133–134° C. The pyrrole (4 g.) and 90% formic acid (4 cc.) were heated together for 1 hour at 100° C., cooled to room temperature and 60% perchloric acid (1.15 cc.) added. The dyestuff was isolated by pouring the solution into water, and recrystallising from methanol. Yield 0.49 g. of purified dyestuff decomposing at 150° C. It is soluble in solvents such as acetone and alcohol but is not bleached by alkaline sulfite solutions.

EXAMPLE 15

1,1' - [diphenylene - (4:4')]bis[2:5 - dimethyl pyrrole] (3.4 g.) (Paol and Schnieder Ber, 19, 3158) and 90% formic acid (10 cc.) were heated together at 100° C. for 4 hours and were then left for 60 hours. 60% perchloric acid (2 cc.) was added and the solid mass filtered. The dyestuff was recrystallised from methanol as a yellow solid. Yield 0.7 g. of pure dye decomposing above 240° C. The dyestuff gives yellow solutions in solvents such as acetone and alcohol but is not bleached by alkaline sulfite solutions.

EXAMPLE 16

*Bis-3-(1-β-hydroxyethyl-2:5-dimethylpyrrolo) monomethine cyanine perchlorate*

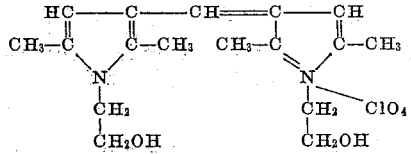

β-Ethanolamine (12 g.) and acetonyl acetone (25 g.) were mixed together and allowed to stand at room temperature for 60 hours. The water produced was distilled off under reduced pressure and finally the 1-β-ethanol-2:5-dimethyl pyrrole was distilled under reduced pressure being collected as an oil, B. P. 133–140° C./12 mm. Yield 22 g. or 79%. The pyrrole (4 g.) and 90% formic acid (8 cc.) were heated together at 100° C. for ½-hour. Cooled to 20° C. and 60% perchloric acid (2.5 cc.) was added whereupon the dyestuff separated out and was filtered off. Recrystallised from methanol as brown crystals giving yellow solutions. Yield 1.5 g. or 42%; M. P. 185–186° C. The dyestuff is soluble in solvents such as acetone and alcohol and is bleached by alkaline sulfite solutions such as photographic developers.

EXAMPLE 17

*Bis-3-(1-butyl-5-methyl-4-carbethoxy-2-phenyl pyrrolo) monomethine cyanine perchlorate*

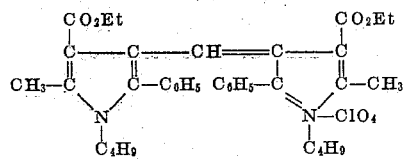

Ethyl acetoacetate (13 g.) and chloroacetophenone (15.5 g.) were mixed together and cooled in ice. Butylamine (14.6 g.) was added slowly and the solution then left to stand for 48 hours. The pyrrole was obtained by diluting the solution with water, extracting with ether, drying the ether solution with calcium chloride and distilling under reduced pressure. The 1-butyl-2-methyl-3-carbethoxy-5-phenylpyrrole was obtained as an oil boiling at 130–180° C./20 mm. Yield 3 cc. The pyrrole (2 cc.) and 90% formic acid (4 cc.) were heated together at 100° C. for 3 hours and a red color slowly developed. The solution was cooled to room temperature and 60% perchloric acid (1.5 cc.) added and then the solution was poured into water. The oil which separated was extracted with ether to give a reddish solution not bleached by alkaline sulfite solutions.

EXAMPLE 18

*Bis-3-(1-butyl-2:5-dimethyl-4-carbethoxy pyrrolo) monomethine cyanine perchlorate*

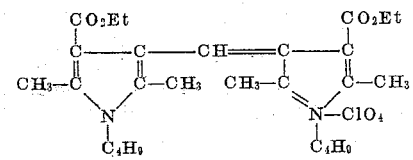

Ethylacetoacetate (14 g.) and chloroacetone (9.3 g.) were mixed together, cooled in ice and butylamine (14.6 g.) was added slowly. After 1 hour the mixture was heated on the steam bath for 1 hour then cooled, diluted with water and extracted with ether. The ether solution containing the pyrrole was dried with calcium chloride and distilled under reduced pressure. 1-butyl-2:5-dimethyl-3-carbethoxy pyrrole was obtained as a pale yellow oil, B. P. 100–110° C./2 mm. Yield 13 g. or 59%. The pyrrole (2 cc.) and 90% formic acid (4 cc.) were heated together at 100° C. for 45 minutes, then cooled to 20° C. and 60% perchloric acid (1.5 cc.) added. The solution was poured into water and an oil separated which was extracted with ether to give a magenta solution. The solution is bleached by alkaline sulfite solutions such as photographic developers.

EXAMPLE 19

Bis-3-(1-butyl-5-methyl-4-carbethoxy-2-propyl pyrrolo) monomethine cyanine perchlorate

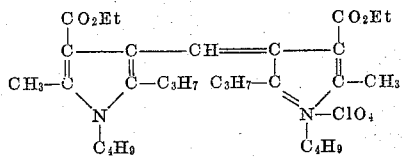

Chloromethyl propyl ketone (by the method of Ritter and Sokol, J. A. C. S. 70, 3419 (1948)) (6 g.), ethyl acetoacetate (6.5 g.), methylated spirit (25 cc.) and butylamine (7.3 g.) were mixed together and left for 60 hours. Volatiles remaining were removed by heating under reduced pressure when some crystals separated. These were filtered off and the filtrate distilled at low pressure whereupon a high boiling point oil was obtained.

Either 1 g. of the crystals or 2 cc. of the high boiling oil with 90% formic acid at 100° C. produced a reddish color indicating the presence of the dye.

What I claim as my invention and desire secured by Letters Patent of the United States is:

1. A process for preparing a monomethine dye consisting in heating a 5-alkylpyrrole containing no substituent in the 3-position, a substituent selected from the group consisting of an alkyl group, a cycloalkyl group, a phenyl group, an anilino group and a pyridyl group in the 1-position, and a substituent selected from the group consisting of an alkyl group and a phenyl group in the 2-position, together with formic acid, the amount of formic acid used being at least equivalent to that of the said pyrrole.

2. A process for preparing a monomethine dye consisting in heating together a 2,5-dimethylpyrrole containing no substituent in the 3-position and a primary alkyl group containing from 1 to 18 carbon atoms in the 1-position with formic acid, the amount of formic acid used being at least equivalent to that of the said pyrrole.

3. A process for preparing a monomethine dye consisting in heating together a 2,5-dimethylpyrrole containing no substituent in the 3-position and a cycloalkyl group containing from 5 to 6 carbon atoms in the 1-position with formic acid, the amount of formic acid used being at least equivalent to that of the said pyrrole.

4. A process for preparing a monomethine dye consisting in heating together, two molecular equivalents of a 2,5-dimethylpyrrole containing no substituent in the 3-position and a primary alkyl group containing from 1 to 18 carbon atoms in the 1-position with at least two molecular equivalents of formic acid.

5. A process for preparing a monomethine dye consisting in heating together two molecular equivalents of a 2,5-dimethylpyrrole containing no substituent in the 3-position and a cycloalkyl group containing from 5 to 6 carbon atoms in the 1-position with at least two molecular equivalents of formic acid.

6. A process according to claim 4 wherein the formic acid has a strength of from 50 to 100 per cent by weight.

7. A process according to claim 5 wherein the formic acid has a strength of from 50 to 100 per cent by weight.

8. A process according to claim 4 wherein the formic acid has a strength of from 80 to 90 per cent by weight.

9. A process according to claim 5 wherein the formic acid has a strength of from 80 to 90 per cent by weight.

10. A process for preparing bis-3-(1-cyclohexyl-2,5-dimethylpyrrole) monomethine cyanine formate consisting in heating together 1-cyclohexyl-2,5-dimethylpyrrole with formic acid, the amount of formic acid used being at least equivalent to that of the said pyrrole.

11. A process for preparing bis-3-(1-dodecyl-2,5-dimethylpyrrole) monomethine cyanine formate consisting in heating together 1-dodecyl-2,5-dimethylpyrrole with formic acid, the amount of formic acid used being at least equivalent to that of the said pyrrole.

12. A monomethine cyanine dye selected from those represented by the following general formula:

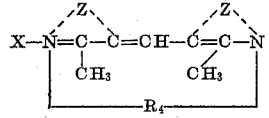

wherein $R_4$ represents a member selected from the group consisting of an alkylene group and a phenylene group, Z represents the non-metallic atoms necessary to complete a heterocyclic nucleus of the pyrrole series, and X represents an anion.

References Cited in the file of this patent

UNITED STATES PATENTS

| | | |
|---|---|---|
| 2,268,798 | Brooker | Jan. 6, 1942 |
| 2,405,106 | Widmer | July 30, 1946 |
| 2,478,367 | Brooker | Aug. 9, 1949 |
| 2,479,152 | Brooker | Aug. 16, 1949 |
| 2,541,400 | Brooker | Feb. 13, 1951 |

FOREIGN PATENTS

| | | |
|---|---|---|
| 529,440 | Great Britain | 1940 |
| 562,754 | Great Britain | 1944 |

OTHER REFERENCES

Fischer: "Die Chemie des Pyrrols," vol. 2 (1943), pp. 3 and 60.

Brooker: J. Amer. Chem. Soc., vol. 67, November 15, 1945, pp. 1869–74.